W. A. FIFIELD.
SOCKET WRENCH.
APPLICATION FILED JAN. 31, 1918.
1,281,928.
Patented Oct. 15, 1918.
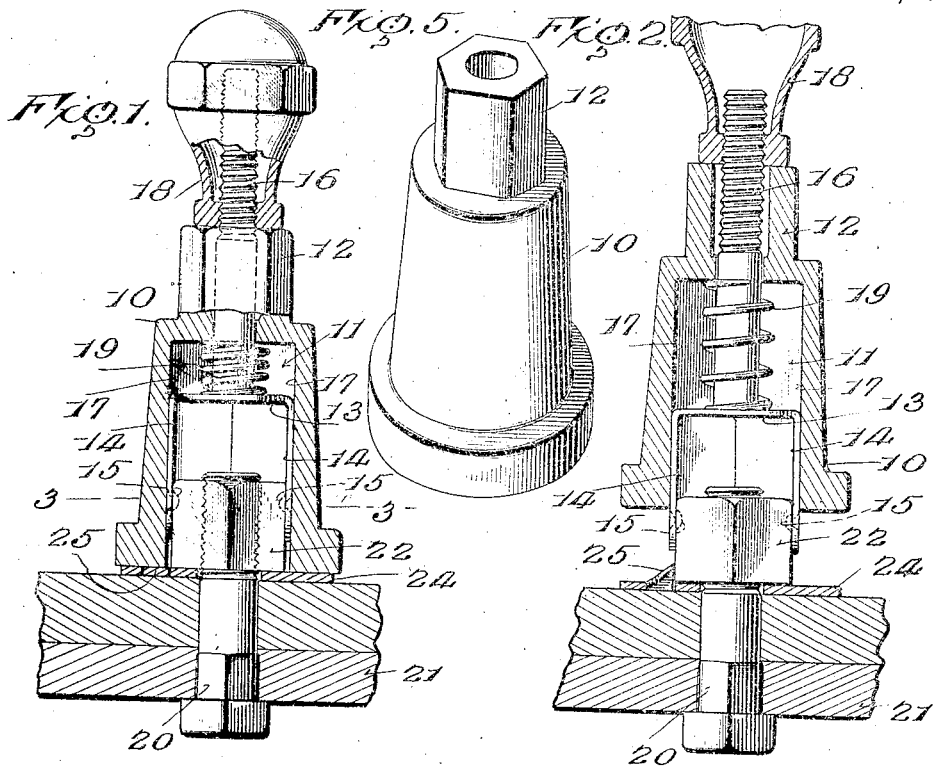
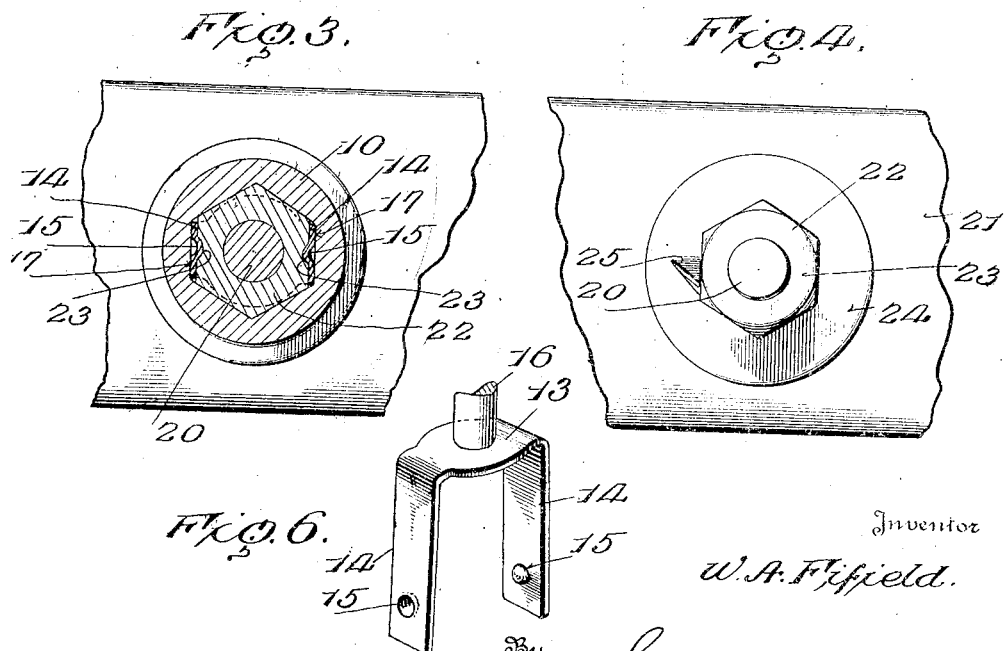
Inventor
W. A. Fifield.
By Lacey & Lacey
Attorneys

UNITED STATES PATENT OFFICE.

WILLIAM A. FIFIELD, OF ABBEY, SASKATCHEWAN, CANADA.

SOCKET-WRENCH.

1,281,928.

Specification of Letters Patent.

Patented Oct. 15, 1918.

Application filed January 31, 1918. Serial No. 214,678.

*To all whom it may concern:*

Be it known that I, WILLIAM A. FIFIELD, subject of the King of Great Britain, residing at Abbey, Province of Saskatchewan, Canada, have invented certain new and useful Improvements in Socket-Wrenches, of which the following is a specification.

This invention relates to a socket wrench and has as its primary object to provide a device of this character particularly adapted for removing bolt nuts held in each instance by the spring tongue of a locking washer, the device being constructed to disengage the said tongue so that the nut may be readily rotated for removal by the device.

The invention has as a further object to provide a socket wrench employing a shell or body and a nut engaging yoke slidably adjustable within the shell so that the yoke may be first engaged with the nut and then adjusted for drawing the shell down over the nut to engage therewith and at the same time depress the upwardly bent spring tongue of the locking washer out of the path of rotary movement of the nut to permit of its removal.

The invention has as a further object in this connection to provide a construction wherein the nut engaging yoke will be equipped with centering lugs to coöperate with the nut and wherein the shell, upon being clamped down over the nut, will tightly bind the arms of the yoke in engagement with the nut.

And the invention has as a still further object to provide an arrangement wherein the nut receiving socket of the shell will be cut back or recessed at opposite sides thereof for receiving the arms of the nut engaging yoke so that the said arms will coöperate with the shell to complete the symmetrical contour of the walls of the said socket for snugly receiving the nut.

Other and incidental objects will appear as the description proceeds, and in the drawings wherein I have illustrated the preferred embodiment of the invention, and wherein similar reference characters designate corresponding parts throughout the several views:

Figure 1 is a vertical sectional view showing my improved device engaged with the nut of a conventional type of bolt and illustrating the manner in which the shell of the device is adapted to depress the spring tongue of a locking washer normally holding the nut, Fig. 2 is a similar view showing the manner in which the device is applied to the nut, Fig. 3 is a transverse sectional view taken on the line 3—3 of Fig. 1, and illustrating the manner in which the socket of the shell of the device is recessed at opposite sides thereof for receiving the arms of the nut engaging yoke of the wrench, Fig. 4 is a plan view illustrating the normal disposition of the spring tongue of the locking washer for the nut, Fig. 5 is a detail perspective view of the shell, and Fig. 6 is a fragmentary perspective view showing the nut engaging yoke in detail.

In carrying out the invention I employ a shell or body 10 provided with an axial nut receiving socket 11 and formed at its upper extremity with a reduced portion 12 having flat faces to receive any suitable tool for rotating the shell. Slidably mounted within the shell is a nut engaging yoke 13 shown in detail in Fig. 6 of the drawings. As there illustrated this yoke is preferably formed of suitable resilient sheet metal and is provided with substantially parallel spring arms 14 joined by a connecting portion laterally enlarged between the arms and struck from the arms adjacent their free ends are oppositely disposed and inwardly directed centering lugs 15. Rising from the connecting portion of the yoke is a stem 16. As particularly brought out in Figs. 1 and 2 of the drawings, the yoke is somewhat shorter than the depth of the nut receiving socket of the shell and, as shown in Fig. 3, this socket is cut back or provided at opposite sides thereof with longitudinally extending recesses 17 slidably receiving the arms of the yoke. The stem 16 of the yoke is loosely received through the top wall of the shell and adjustably connecting the said yoke with the shell is a hollow handle or grip 18, screw threaded upon the said stem to coöperate with the shell. As will be clear, this grip may be rotated for retracting the yoke into the nut receiving socket of the shell and normally tending to eject the said yoke from the shell is a helical ejector spring 19 surrounding the inner extremity of the stem 16 and imposed between the inner end wall of the socket 11 and the laterally enlarged area of the connecting portion of the yoke.

In order that the operation of my improved wrench may be accurately understood, I have, in the drawings, shown the device in connection with a conventional type of bolt 20 fitted through coacting members 21, representing the work, and equipped with a nut 22. For the purposes of the present invention this nut is formed upon opposite side faces thereof with sockets 23. Interposed between the nut and the work to surround the bolt is a flat washer 24 having an upwardly deflected resilient locking tongue 25 struck therefrom to normally engage one side of the nut, as shown in Fig. 4, for holding the nut against retrograde movement and consequently locking the nut upon the bolt. In use, the grip 18 is first adjusted to permit the yoke to be ejected from the shell in the manner suggested in Fig. 2 of the drawings, when the spring arms 14 of the yoke are then flexed to fit over opposite sides of the nut 22 and engage the lugs 15 thereof within the sockets 23. As will be clear, these lugs will act to retain the yoke centered with respect to the nut so that the grip 18 may then be adjusted upon the yoke stem 16 for retracting the yoke within the shell and consequently shifting the shell against the tension of the spring 19, down over the nut to snugly receive the nut, as shown in Fig. 1, within the nut receiving socket 11. In this position of the shell the said shell will, of course, act to firmly bind the arms of the yoke against the sides of the nut and in this connection it is to be particularly noted, as shown in Fig. 3, that the said arms, by being mounted within the recesses 17 of the socket 11, are arranged to complete the symmetrical contour of the socket and coact with the walls thereof for engagement with the nut. The device will, when rotated for turning the nut, thus act against all sides of the nut and while, in the present instance, I have shown the nut as formed with six sides and the socket 11 of the shell similarly constructed to fit the nut, still it is to be understood that I do not wish to be limited in this regard, as the contour of the said socket may be readily varied within the spirit of the present invention for receiving other types of nuts.

Attention is now directed to the fact that when the grip 18 is adjusted to engage the shell 10 over the nut 22 as previously described, the said shell will, in being disposed to overlie the locking tongue 25 of the washer 24, be, at the same time, caused to depress the said tongue, as shown in Fig. 1, and hold the tongue out of the path of rotary movement of the nut so that the said nut may be readily displaced. Thus, my improved socket wrench is, as previously mentioned, particularly adapted for use in any instance where the nut of a bolt is held by a locking washer of the character shown and it will be noted that the shell is formed with a flat and smooth inner end to engage the locking tongue of the washer so that when the shell is rotated with the nut, the said shell may readily ride over the tongue.

As particularly shown in Figs. 1 and 2 of the drawings, the grip 18 is provided with a wrench receiving portion. By thus forming the said grip, the device is rendered particularly convenient for removing the nuts holding the teeth of a threshing machine cylinder. When so used, the yoke is first connected, in the manner previously described, with the nut of the tooth which it is desired to remove, when a suitable wrench may then be inserted within the cylinder and engaged with the wrench receiving portion of the grip for adjusting the grip to clamp the shell 10 down over the nut. The device will then be firmly connected with the nut so that a wrench or other suitable tool may be engaged with the reduced portion 12 of the shell for rotating the shell to remove the said nut. Since the device is thus adapted to be initially connected rigidly with the nut ready for the application of a wrench to the shell for removing the nut, the difficulty which is now experienced in properly engaging an ordinary wrench with the nuts of the cylinder teeth, owing to the limited space within the said cylinder is overcome.

Having thus described the invention, what is claimed as new is:

1. A device of the character described including a shell formed with a nut receiving socket, and a nut engaging yoke adjustable upon the shell axially of the said socket, the said yoke including substantially parallel resilient arms adapted to embrace a nut for engagement with opposite sides thereof.

2. A device of the character described including a shell formed with a nut receiving socket, a nut engaging yoke adjustable upon the shell axially of the said socket, the said yoke including spaced resilient arms, and centering lugs carried by the free extremities of said arms and adapted for engagement with opposite sides of a nut for centering the yoke and socket with respect to the nut.

3. A device of the character described including a shell provided with a nut receiving socket, and a nut engaging yoke adjustable upon the shell axially of the said socket and including spaced arms adapted to embrace a nut and disposed when within the socket to complete the symmetrical contour thereof.

4. A device of the character described including a shell provided with a nut receiving socket having opposite walls thereof recessed, and a nut engaging yoke adjustable upon the shell axially of the said socket and including spaced arms adapted to embrace a nut and received within said recesses to coöperate with the walls of the socket and complete the symmetrical contour thereof.

5. A device of the character described including a shell having a smooth flat inner end and provided with a nut receiving socket, and a nut engaging yoke adjustable upon the shell axially of the said socket to a position lying within the socket whereby the shell may fit over a nut engaged by the yoke with the inner end of the shell holding a normally upsprung locking tongue of a locking washer for the nut depressed out of the path of rotary movement of the nut.

6. A device of the character described including a shell provided with a nut receiving socket, a nut engaging yoke carried by the shell and shiftable into the said socket, a stem projecting from said yoke through the wall of the shell at the inner end of the socket, and means carried by the said stem to coöperate with the shell for adjusting the yoke axially of the said socket.

7. A device of the character described including a shell provided with a nut receiving socket, a nut engaging yoke carried by the shell and shiftable into the said socket, a stem projecting from said yoke through the wall of the shell at the inner end of the socket, means carried by the said stem to coöperate with the shell for adjusting the yoke axially of the said socket, and yieldable means bearing between the shell and yoke and tending to project the yoke from the said socket.

In testimony whereof I affix my signature.

WILLIAM A. FIFIELD. [L. S.]